June 15, 1926.
S. WILEY
EMERGENCY LANDING FLARE
Filed Dec. 5, 1925   2 Sheets-Sheet 2
1,589,277
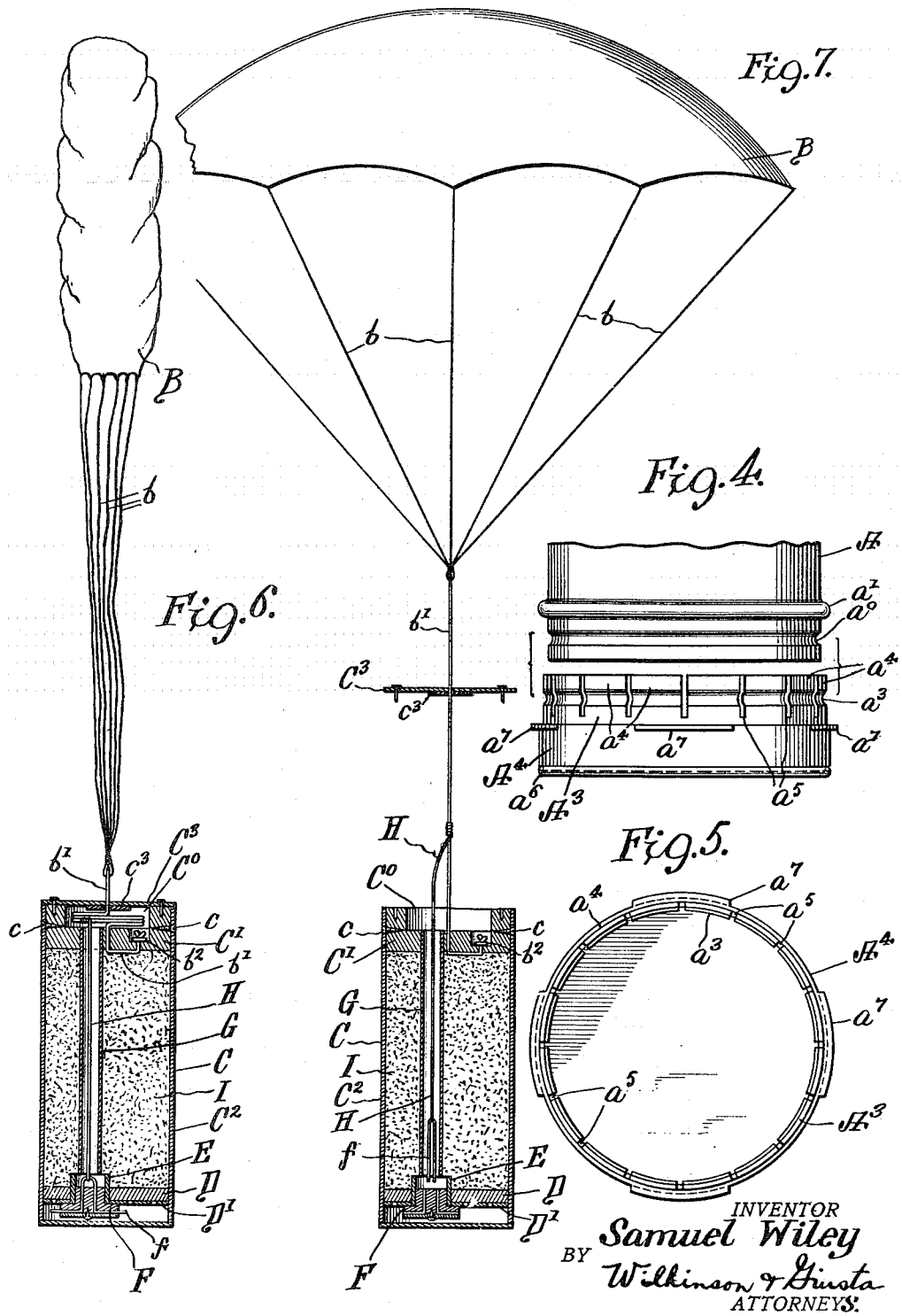

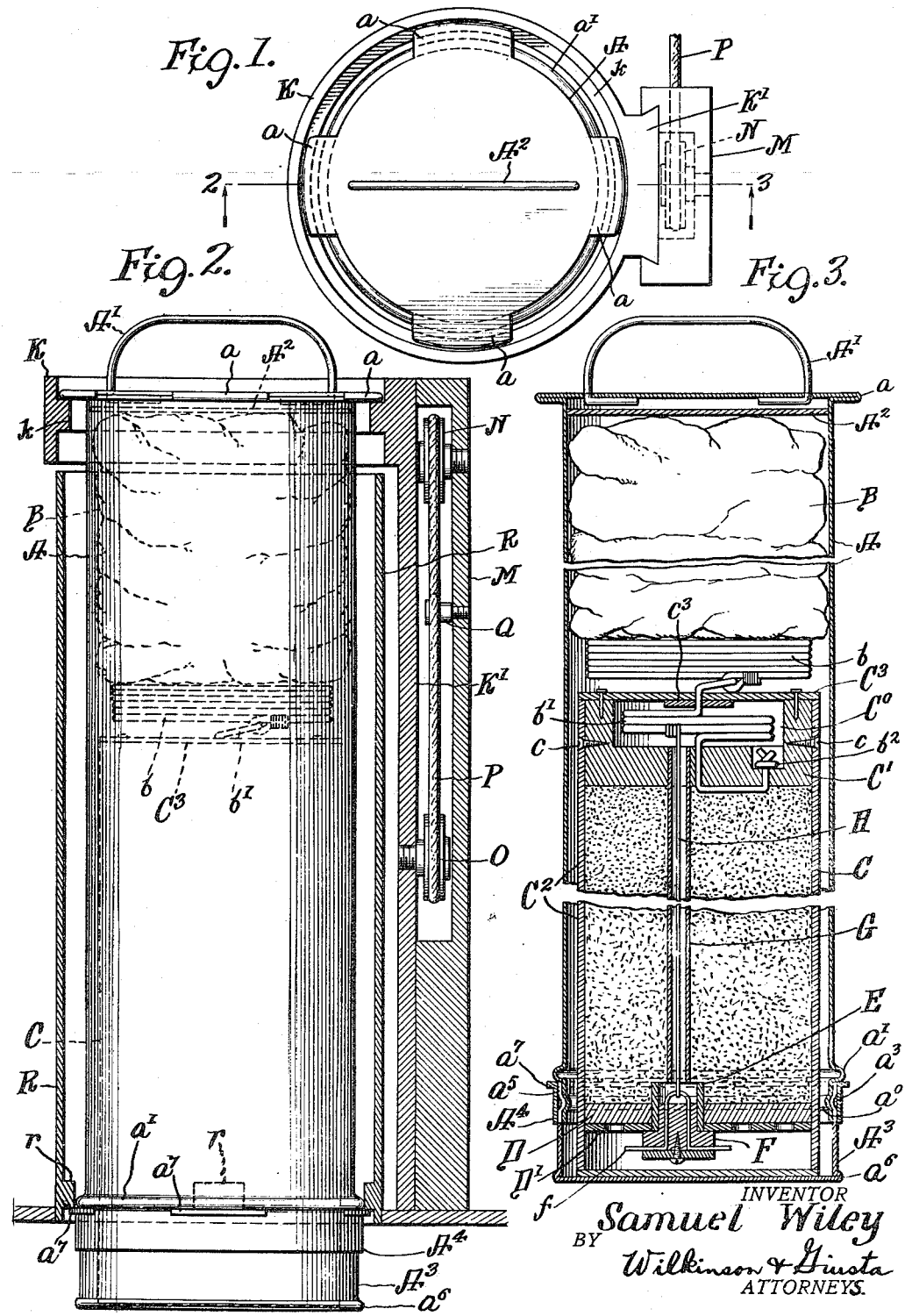

Patented June 15, 1926.

1,589,277

UNITED STATES PATENT OFFICE.

SAMUEL WILEY, OF METUCHEN, NEW JERSEY.

EMERGENCY-LANDING FLARE.

Application filed December 5, 1925. Serial No. 73,367.

My present invention relates to a parachute flare intended to be dropped from aircraft for the purpose of illuminating the land, or water, or any other objects beneath the flare.

The invention is especially adapted for use in making night landings by operators of aircraft, who wish to land on fields or harbors, which are not illuminated.

My invention is intended to provide a flare, which may be conveniently carried by and dropped from any type of aircraft and which, when dropped from an ordinary elevation for safe flying, will not operate until it has fallen through an appreciable distance, and when operated, full illumination is promptly produced.

For these reasons, the flare is especially adapted for emergency landings in unknown territory, in case of storms, or engine trouble or other troubles, which render it necessary or desirable to land.

The invention will be more fully understood after reference to the accompanying drawings, in which one embodiment of the invention is shown, and one means for operating the releasing mechanism is illustrated and described, but I do not mean to limit the invention either to such releasing means or to the particular construction and combination illustrated and described, as obviously numerous changes might be made in these, without departing from the spirit of my invention.

In the drawings, like reference symbols indicate similar parts throughout the several views, and Fig. 1 is a plan view showing the upper portion of the container with one form of releasing means carried by the aircraft;

Fig. 2 shows a section along the line 2—3 of Fig. 1, and looking in the direction of the arrows, the container for the flare being shown in elevation;

Fig. 3 shows a section through the container along the line 2—3 of Fig. 1, but detached from the releasing mechanism, the parts being in the position shown in Figs. 1 and 2;

Fig. 4 is a detail view showing the lower end of the container for the flare with its removable bottom detached therefrom and about to fall away;

Fig. 5 is a plan view of the removable bottom shown in Fig. 4;

Fig. 6 shows the parachute and the flare body just after they have been released from the container and before the parachute has opened, and shows the friction primer in the normal position; and Fig. 7 is a similar view showing the parachute open and the friction primer operated, but for purposes of illustration the inner and outer bottoms of the flare are not shown as blown out as would happen when the primer is operated.

Referring to the details, A represents an outer container in which the parachute B and the flare body C may be conveniently carried. This container A is preferably made of metal, and is provided with a number of flanged lugs $a$ (four are shown), with a flexible wire $A'$ for lifting the same and with an inner disc $A^2$ to protect the upper end of the parachute in packing or transporting the same.

The lower end of the container A is provided with an annular rib $a'$ and with an annular groove $a^0$, as shown most clearly in Figs. 3 and 4.

I provide a bottom cup $A^3$, which is provided with a circumferential annular groove $a^3$ in the teeth $a^4$, which are separated by the notches $a^5$, and thus will permit the cup $A^3$ to be sprung over and engage the bottom of the container A. This cup $A^3$ is provided with an annular bead or rib $a^6$ at its lower outer edge; and telescopically mounted on this cup $A^3$ is a ring $A^4$ having a series of segmental flanges or lugs $a^7$ (four are shown) projecting outwardly therefrom, as shown in Figs. 2 to 5. When this ring is in the raised position, shown in Figs. 2 and 3, it will lock the bottom $A^3$ firmly to the container A, but when this ring is pressed down to the position shown in Fig. 4, it will engage the bead $a^6$ of the cup $A^3$ and a slight further downward pressure will cause the cup to be detached from the container A, permitting the contents of said container to drop out.

The ring will normally be held in the upper position by frictional engagement and may be pressed downward, releasing the cup $A^3$, either by hand or by suitable apparatus carried by the aircraft.

Obviously, a great variety of apparatus adapted for this purpose might be constructed, and I have shown outlines of one form of such apparatus in Figs. 1 and 2, the details of which I have illustrated and described in my co-pending application, Serial No. 47,967, filed Aug. 3, 1925, and entitled improvements in emergency landing flares. Such details will be referred to only briefly herein in connection with the operation of the device.

The parachute B is mounted in the container A and its shrouds b are connected by the flexible connector b' to the head C' of the outer shell C² of the flare body, which shell may be made of waterproof paper or cardboard or other suitable material, and the head C', preferably of wood, may be secured therein in any convenient way, as by means of screws or nails c. This head is chambered as at C⁰, to permit the coiling therein of the connector b', and this head is covered with a detachable cap C³ reinforced at its center by the disc c³, so that when the parachute is expanded, as shown in Fig. 7, this cap C³ will be torn off, permitting the connector b' to straighten itself out. The lower end of this connector is securely attached to the head C' in any convenient way, as for instance as is shown at b² in Fig. 3.

The shell C² is provided near its lower end with an ignition charge D above the perforated annular disc D', through which disc and bottom a sleeve E projects. This sleeve is open at the top and is closed at the bottom by the primer plug F, having the friction igniter f in the form of a wire, adapted to be drawn through and ignite suitable friction composition, well known in the art.

Passing through the illuminating composition I in the flare body, preferably at one side of the axis thereof, is a hollow tube G, through which passes the primer operating wire H, which is connected at its upper end to the connector b', and at its lower end to the primer wire f. The length of this wire H is so adjusted that after the parachute and flare body have been released and after the parachute has expanded, the first effect of the jerk occasioned by the descending weight of the flare body will be to tear off the cap C³, and then just before the connector b' has fully tautened, a second jerk withdraws the primer wire f, as shown in Fig. 7, and thereafter the weight of the flare body is supported by the head C' and the connector b'. When the primer is ignited, the flames are communicated to the bottom of the flare charge and the bottom is blown out of the casing C² and the illuminating composition I burns from the bottom, illuminating the region below.

As before stated, the parachute and flare body may be held in any suitable container and released either by hand or by any suitable apparatus, not shown, but for convenience of transportation and release, I have provided the container shown in Figs. 1 to 4, and the releasing mechanism shown in Figs. 1 and 2, which releasing mechanism is illustrated and described in detail in my application Serial No. 47,967, filed August 30, 1925 aforesaid, but which will now be briefly described in outline.

K (see Figs. 1 and 2) represents a sliding ring having a shoulder k, which ring is connected to the sliding bar K', which is dovetailed into the frame M carried by the aircraft. This frame has the pulley N pivotally connected thereto, while the bar K' has the pulley O pivotally attached thereto.

The cord P has one end fastened to the stud pin Q, and the free end is rove over the pulley O and the pulley N, and by hauling on this rope or cord, either directly or through the instrumentality of an operating lever, the bar K' may be forced upward, causing the ring K to engage the lugs a of the container A and lifting the container. As the container is lifted, the ring A⁴ will be forced down and cause its lug a⁷ to engage the lugs r near the lower end of the housing R carried by the aircraft.

As the container is moved upwards, the ring A⁴ will unmask the joint between the cup A³ and the container A, and when the cup A³ is raised high enough to cause the bead a⁶ to engage the lower edge of the ring A⁴, as shown in Fig. 4, further upward movement of the container will cause this ring to pull the bottom cup away from the container, and the same will fall clear, as shown in Fig. 4. The cup having been released, the bottom of the container will be open, and the flare body C will fall by gravity therefrom, followed by the parachute, as shown in Fig. 6.

The cycle of operations thereafter is entirely independent of the mode of releasing the flare.

The parachute will soon fill with air and becomes distended, the first jerk will tear off the cap C³, uncoiling the connector b'; the second jerk will cause the primer to ignite the flare composition at the bottom thereof, and the bottom of the flare casing will be blown off, and the flare will continue to burn until the composition in the shell C² is exhausted. Meantime, the flare will be slowly settling towards the ground.

It will be noted that the flare will act as an illuminating cone with the base on the ground and that the parachute in a measure will serve to screen the bodies above same from the illuminating rays.

Any suitable method of installing the flare and parachute in the aircraft may be employed and any suitable method of releasing same may be used without departing from the spirit of my invention.

While I have described one embodiment of the invention in its preferred form, and one means for releasing the flare, I do not mean to limit the invention to any particular form, as various changes might be made in the construction, combination and arrangement of parts, which could be used without departing from the spirit of my invention, and I do not mean to limit the invention to such details.

Having thus described my invention, what I claim and desire to secure by Letters Patent of the United States is:

1. A flare arrangement for aircraft, comprising a parachute and a flare body, the said flare body being provided with a safety cap in the upper end thereof detachably connected to said flare body, a flexible connector fixed to and passing through said safety cap and secured at one end to said flare body and at the other end to said parachute, a primer carried by said flare body and adapted to ignite the flare composition contained therein, and an operating wire normally lying loose below said safety cap but adapted to be suddenly tautened when said safety cap is jerked loose, incident to the opening of the parachute, after the flare body and parachute have fallen an appreciable distance below the airplane, whereby said primer is ignited substantially as and for the purposes described.

2. A flare arrangement for aircraft comprising a parachute and a flare body, the parachute provided with shrouds connected together at the lower end, the said flare body being provided with a safety cap in the upper end thereof, detachably connected to said flare body, a flexible connector fixed to and passing through said safety cap and secured at one end to said flare body and at the other end to said shrouds, a primer carried by said flare body and adapted to ignite the flare composition contained therein, and an operating wire normally lying loose below said safety cap but adapted to be suddenly tautened when said safety cap is jerked loose, incident to the opening of the parachute, after the flare body and parachute have fallen an appreciable distance below the airplane, whereby said primer is ignited substantially as and for the purposes described.

SAMUEL WILEY.